Sept. 8, 1964   A. D. HOEPPNER   3,147,674
METHODS OF MAKING BAGS
Original Filed Aug. 22, 1958   3 Sheets-Sheet 1
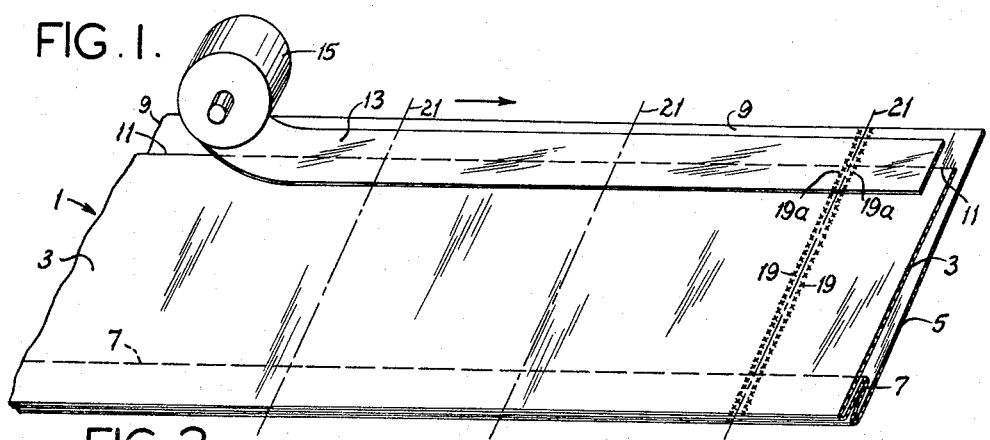
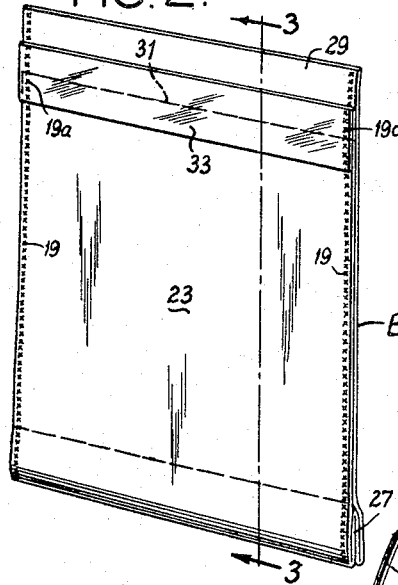
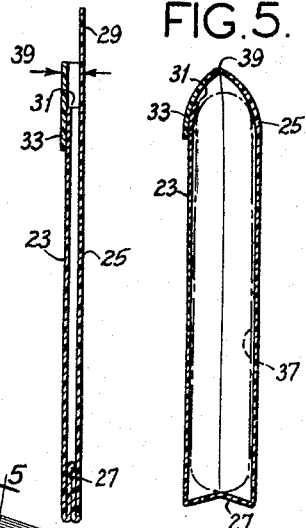
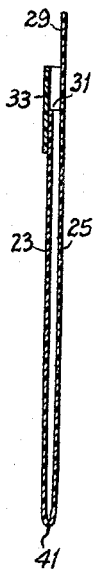
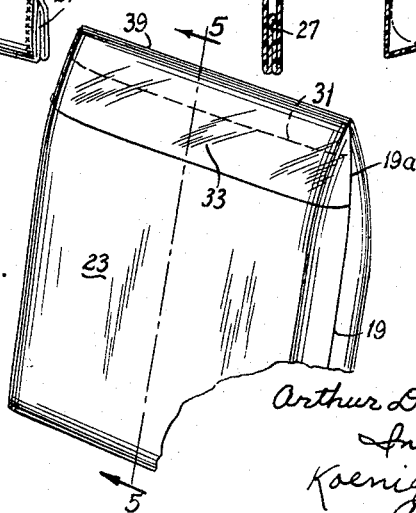
Arthur D. Hoeppner,
Inventor.
Koenig and Pope,
Attorneys.

Sept. 8, 1964  A. D. HOEPPNER  3,147,674
METHODS OF MAKING BAGS
Original Filed Aug. 22, 1958  3 Sheets-Sheet 2
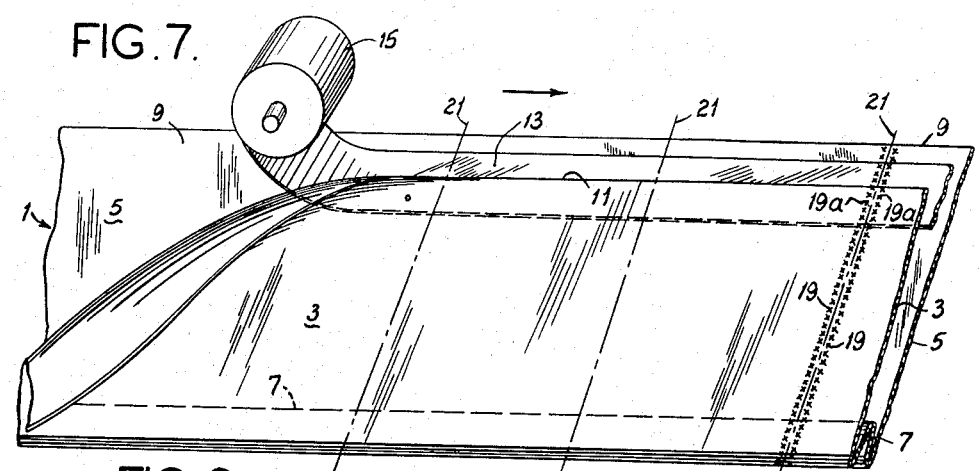
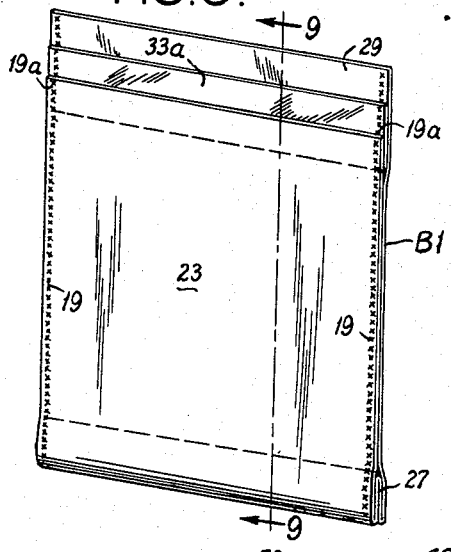
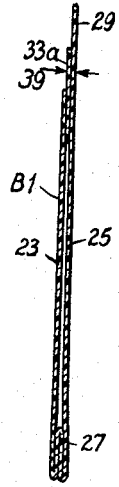
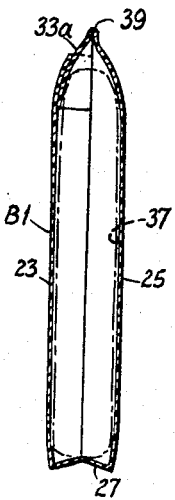
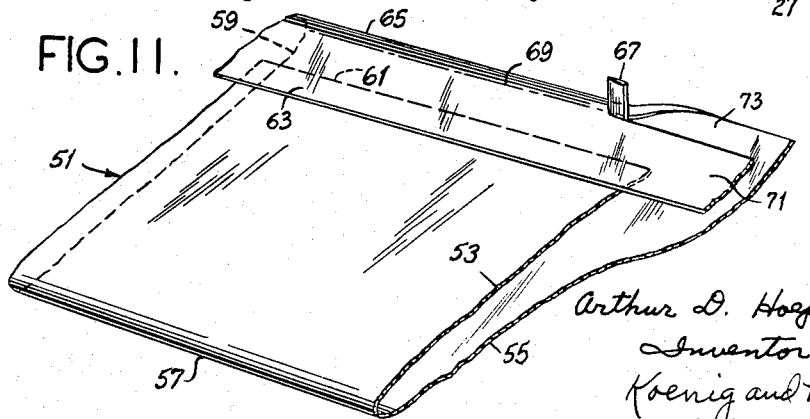
Arthur D. Hoeppner,
Inventor.
Koenig and Pope,
Attorneys.

Sept. 8, 1964    A. D. HOEPPNER    3,147,674
METHODS OF MAKING BAGS
Original Filed Aug. 22, 1958    3 Sheets-Sheet 3

Arthur D. Hoeppner,
Inventor.
Koenig and Pope,
Attorneys.

United States Patent Office 3,147,674
Patented Sept. 8, 1964

3,147,674
METHODS OF MAKING BAGS
Arthur D. Hoeppner, Terre Haute, Ind., assignor to Bemis Bro. Bag Company, St. Louis, Mo., a corporation of Missouri
Original application Aug. 22, 1958, Ser. No. 756,633. Divided and this application June 22, 1959, Ser. No. 821,957
6 Claims. (Cl. 93—35)

This invention relates to methods of making bags, and more particularly to methods of making plastic bags.

This application is a division of my copending application Serial No. 756,633, filed August 22, 1958, entitled Bags, now abandoned.

In my United States Patent 2,709,467, issued May 31, 1955, there is shown a bag made of flexible heat-sealable sheet plastic material, such as polyethylene, having a closure-flap-forming portion initially positioned exteriorly of one wall of the bag at the bag mouth adapted to be folded over the mouth of the bag after the bag has been packed to close the bag, and adapted to be opened by reversely folding it to bring it back to its initial position.

Among the several objects of this invention may be noted the provision of methods of economically manufacturing bags similar to those described in my said prior patent but which, after being packed, may be closed by an operation such as a heat-sealing operation, as distinguished from the closing operation involving folding required by my prior construction, the closure as completed by this heat-sealing operation being similar to that obtained by the folding operation for closing carried out on my prior bag. Other objects and features will be in part apparent and in part pointed out hereinafter.

The invention accordingly comprises the methods hereinafter described, the scope of the invention being indicated in the following claims.

In the accompanying drawings, in which several of various possible embodiments of the invention are illustrated, FIG. 1 is a perspective view illustrating a first method for making a first type of bag;

FIG. 2 is a perspective view illustrating a bag made by the method illustrated in FIG. 1;

FIG. 3 is a cross section taken on line 3—3 of FIG. 2, thicknesses being exaggerated;

FIG. 4 is a perspective view showing the bag of FIGS. 2 and 3 after it has been packed and closed;

FIG. 5 is a cross section taken on line 5—5 of FIG. 4;

FIG. 6 is a view similar to FIG. 3 illustrating modification of the bag;

FIG. 7 is a perspective view illustrating a second method for making a second type of bag;

FIG. 8 is a perspective view illustrating a bag made by the method illustrated in FIG. 7;

FIG. 9 is a cross section taken on line 9—9 of FIG. 8, thicknesses being exaggerated;

FIG. 10 is a view similar to FIG. 5 illustrating the bag of FIGS. 8 and 9 as it appears after it has been packed and closed;

FIG. 11 is a perspective view illustrating another method of manufacturing bags of the type shown in FIGS. 2 and 3;

Corresponding reference characters indicate corresponding parts throughout the several views of the drawings.

Figure 12:
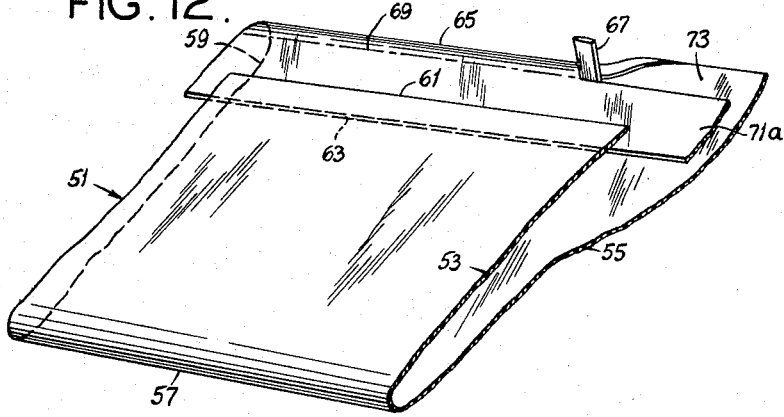
FIG. 12 is a perspective view illustrating a modification of the FIG. 11 method for manufacturing bags of the type shown in FIGS. 8 and 9.

Referring to the drawings, FIG. 1 illustrates a first method for making bags from a continuous web 1 of flexible heat-sealable sheet plastic material such as polyethylene. As shown therein, this web is longitudially folded to have a first wall 3 and a second wall 5 joined along one edge by an integral gusset 7. This folding is carried out by any suitable conventional folding means well known in the art while the web is fed in the direction indicated by the arrow in FIG. 1. The wall 5 is wider than the wall 3 and has a free marginal portion 9 which projects out beyond the free edge 11 of the wall 3. In accordance with this invention, a strip 13 of flexible heat-sealable sheet plastic material such as polyethylene is drawn from a supply roll 15 and superimposed on the folded web 1 extending lengthwise thereof overlying the free edge 11 of the narrower wall 3 of the folded web, whereby part of the strip 13 laps the free margin of the wall 3 and part of the strip overlies part but not all of the free marginal portion 9 of the wider wall 5 of the web. This leaves part of portion 9 projecting laterally outward beyond the strip 13.

The folded web 1 with the strip 13 superimposed thereon is then heat-sealed and segmented on transverse lines at bag width intervals to divide it into individual bags B (one of which is illustrated in FIG. 2) having heat-sealed seams at both sides. Each heat-sealed bag side seam is designated 19. Each line of segmentation, these lines being designated 21 in FIG. 1, lies between a side seam 19 of one bag and the side seam 19 of the next bag segmented from the folded web. The strip 13 is heat-sealed and segmented along with the folded web, the ends of the strip segments being heat-sealed to the bag at the sides thereof by seals indicated at 19a which extend throughout the width of the strip segments on the same lines as seals 19.

As a result of the above-described operations, each bag B has a first wall 23 (which may be termed the front wall) derived from the wall 3 of the folded web 1, and a second wall 25 (which may be termed the back wall) derived from the wall 5 of the folded web. The front wall 23 and back wall 25 are joined at the bottom of the bag by a gusset 27 derived from the gusset 7 of the folded web 1, and are joined along the sides of the bag by the heat-sealed side seams 19. The back wall 25 is of greater height than the front wall 23, and projects beyond the upper or mouth edge of the front wall. The projecting portion of the back wall 25 (derived from portion 9 of the folded web 1) is designated 29 and the mouth edge of the front wall 23 is designated 31. Each bag B also has a strip segment or band 33 (derived from strip 13) extending across the bag from one side edge to the other, overlying the mouth edge 31 of the front wall 23. The ends of band 33 are heat-sealed at 19a to the side edges of bag B, the band otherwise being free of the bag. Portion 29 of the back wall 25 projects beyond the upper edge of the band 33.

The bag B shown in FIGS. 2 and 3 is adapted to be packed with an item such as indicated at 37 in FIG. 5 by inserting the item between the upper portion 29 of the back wall 25 and the band 33, and then between the upper portion of the front wall 23 and the back wall 25. The portion of the back wall which extends beyond the band is free to be gripped to facilitate opening up the mouth of the bag for insertion of the item to be packed therein. The bag is adapted for being packed automatically or semiautomatically, utilizing a device having means for gripping the portion of the back wall 25 which projects beyond band 33, leaving the band and the front wall 23 free, the device also having means for blowing air under the band and between the front wall and the back wall for blowing the bag open. The arrangement is also useful for hand operations, if desired, the projecting portion of the back wall being readily gripped by hand for opening up the mouth of the bag.

After the item has been placed in the bag, the band is heat sealed adjacent its upper margin to the projecting portion 29 of the back wall along a line extending transversely across the bag above the upper edge 31 of the front wall 23, as indicated by the arrows 39 in FIG. 3 and at 39 in FIGS 4 and 5, the portion of the back wall and the band above this seal 39 being simultaneously trimmed off so as to give a neat finished appearance to the package. The final package is then similar to a completed package comprising a bag shown in my prior Patent 2,709,467 in that the mouth of the bag is closed by a closure-flap-forming portion (constituted by the band 33) which extends across the front of the bag having its ends heat sealed to the bag at the side edges thereof. This closure-flap-forming portion 33 is adapted to be folded back to open up the bag by inserting the fingers thereunder adjacent the sides of the bag, and turning it inside out.

FIG. 6 illustrates a modification of the bag shown in FIGS. 2 and 3, differing from the latter in having a flat ungusseted bottom as indicated at 41, instead of having a gusseted bottom as shown in FIGS. 2 and 3. Bags such as shown in FIG. 6 may be made in the same manner as shown in FIG. 1, except that web 1 is folded in such manner that walls 3 and 5 are joined by a single fold instead of by the gusset 7.

FIG. 7 illustrates an alternative method in which the strip 13, instead of being superimposed on the folded web 1 overlying the edge 11 of the narrower wall 3, is fed in between the wall 3 and the wall 5 underlying the edge 11 of wall 3. Otherwise, the operations are the same as in FIG. 1.

FIGS. 8 and 9 illustrate a bag B1 made according to FIG. 7, and FIG. 10 illustrates a completed package comprising the bag B1. The bag B1 is similar to the bag B of FIGS. 2 and 3, and the completed package is similar to the package shown in FIGS. 4 and 5, except that the band, which is designated 33a in FIGS. 8–10 to distinguish it from the band of FIGS. 2–5, lies between the upper portion of the front wall 23 and the back wall 25. To open the package B1, the fingers are inserted between the upper portion of the front wall 23 and the band 33a and then under the band to fold it back.

It will be understood that the bag B1 may be made with an ungusseted bottom, as in the bag shown in FIG. 6.

FIG. 11 shows a method of this invention for making the bags B, which does not require the feeding of the tape 13 as in FIG. 1. As shown in FIG. 11, a web 51 (wider than the web 1) is used, and this web 51 is longitudinally folded to have a first wall 53 (corresponding to wall 3) and a second wall 55 (corresponding to wall 5). FIG. 11 shows these walls joined by a single fold 57 instead of a gusset, but it will be understood that the walls may be joined by a gusset. Wall 55 has a portion 59 projecting out beyond the free edge 61 of wall 53, and a marginal portion 63 of the web is folded over on a longitudinal fold line 65 to overlap the free margin of wall 53. As the folded web 51 is fed forward, the folded-over marginal portion 63 is slit as by a blade 67 along a line 69 adjacent the fold 65. Thus, a strip 71 is separated from the web lying in the same position as occupied by the strip 13 in FIG. 1. The part of the folded-over marginal portion 63 outward of the slitting line 69 folds back outward so that the wall 55 has portion 73 projecting out beyond the strip 71. The end result is a folded web like that shown in FIG. 1 with a strip superimposed thereon in the same manner as in FIG. 1, and this is converted into bags B in the same manner as shown in FIG. 1.

FIG. 12 shows a method similar to the FIG. 11 method for making bags B1 of FIGS. 8 and 9, which does not require the feeding of tape 13 as in FIG. 7. The FIG. 12 is essentially the same as the FIG. 11 method except that the marginal portion 63 of the web 51, instead of being folded to overlap the free margin of wall 53, is folded over to underlie the free margin of wall 53. Consequently, the strip 71a separated by blade 67 lies in the same position as occupied by the strip 13 in FIG. 7. The end result is a folded web like that shown in FIG. 7 with a strip between the walls, and this is converted into bags B1 in the same manner as shown in FIG. 7.

Figure 13:
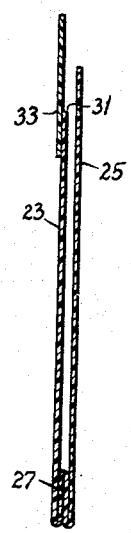
FIG. 13 is a view similar to FIG. 3 illustrating a modification thereof.
Figure 14:
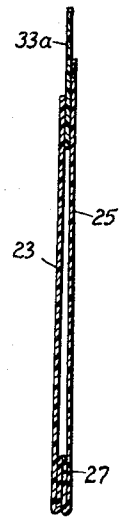
FIG. 14 is a view similar to FIG. 9 illustrating a modification thereof.

FIG. 13 shows a modification of the bag B shown in FIGS. 2 and 3 in which the width of band 33 is such that the band projects beyond the upper edge of the wall 25. FIG. 14 shows a modification of the bag B1 shown in FIGS. 8 and 9 in which the band 33a projects beyond the upper edge of the wall 25. These types of construction may be desirable, for example, in instances where it is desirable to hold the bag in a packing device by gripping the band rather than the wall 25. They may be made by methods similar to those illustrated in FIGS. 1, 7, 11 and 12.

In view of the above, it will be seen that the several objects of the invention are achieved and other advantageous results attained.

As various changes could be made in the above methods without departing from the scope of the invention, it is intended that all matter contained in the above description or shown in the accompanying drawings shall be interpreted as illustrative and not in a limiting sense.

I claim:

1. The method of making bags comprising folding a continuous web of bag material longitudinally to provide a first wall and a second wall with the second wall wider than the first wall, folding the web such that a marginal portion thereof is folded back over from the second wall toward the first wall, slitting the marginal portion longitudinally to provide a strip extending lengthwise of the web in position lapping the free edge of the first wall, then segmenting the folded web with the strip thereon at bag width intervals and side-seaming the segments, the strip being simultaneously segmented and having its ends secured to the segments at the side seams.

2. The method of claim 1 wherein said marginal portion is folded to overlie the free edge of said first wall and said strip accordingly overlies the free edge of the first wall.

3. The method of claim 1 wherein said marginal portion is folded to lie between the walls and said strip accordingly lies between the walls.

4. The method of making bags comprising folding a continuous web of heat-sealable plastic longitudinally to provide a first wall and a second wall with the second wall wider than the first wall, folding the web such that a marginal portion thereof is folded back over from the second wall toward the first wall, slitting the marginal portion longitudinally to provide a strip of heat-sealable plastic extending lengthwise of the web in position lapping the free edge of the first wall, then simultaneously heat-sealing and segmenting the folded web with the strip thereon on transverse lines spaced at bag width intervals to form bags with heat-sealed side seams, the strip being simultaneously segmented and having its ends heat-sealed to the bags at their side seams.

5. The method of claim 4 wherein said marginal portion is folded to overlie the free edge of said first wall and said strip accordingly overlies the free edge of the first wall.

6. The method of claim 4 wherein said marginal portion is folded to lie between the walls and said strip accordingly lies between the walls.

References Cited in the file of this patent

UNITED STATES PATENTS

| | | |
|---|---|---|
| 2,643,049 | Bartelt | June 23, 1953 |
| 2,873,566 | Sylvester | Feb. 17, 1959 |
| 2,929,180 | Walters | Mar. 22, 1960 |
| 3,069,978 | Hoeppner | Dec. 25, 1962 |